(12) United States Patent
Ichihara

(10) Patent No.: US 11,368,989 B2
(45) Date of Patent: Jun. 21, 2022

(54) INFORMATION PROCESSING APPARATUS, METHOD OF CONTROLLING THE SAME, AND PROGRAM

(71) Applicant: CANON KABUSHIKI KAISHA, Tokyo (JP)

(72) Inventor: Ko Ichihara, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/646,742

(22) PCT Filed: Sep. 26, 2018

(86) PCT No.: PCT/JP2018/035685
§ 371 (c)(1),
(2) Date: Mar. 12, 2020

(87) PCT Pub. No.: WO2019/065731
PCT Pub. Date: Apr. 4, 2019

(65) Prior Publication Data
US 2020/0267782 A1    Aug. 20, 2020

(30) Foreign Application Priority Data

Sep. 28, 2017 (JP) .............................. JP2017-188983

(51) Int. Cl.
*H04W 4/00*    (2018.01)
*H04W 76/11*   (2018.01)
(Continued)

(52) U.S. Cl.
CPC ......... *H04W 76/11* (2018.02); *H04L 61/2007* (2013.01); *H04L 61/6059* (2013.01); *H04W 84/18* (2013.01)

(58) Field of Classification Search
CPC ....... H04W 88/06; H04W 4/80; G06F 3/1292; G06F 3/1285; G06F 3/1291
See application file for complete search history.

(56) References Cited

U.S. PATENT DOCUMENTS

2014/0328343 A1* 11/2014 Kapadia ................ H04L 45/741
370/392
2015/0127949 A1   5/2015 Patil
(Continued)

FOREIGN PATENT DOCUMENTS

JP    2017063312 A    3/2017

OTHER PUBLICATIONS

"Canon: PIXMA Manuals: TR8500 series: LAN settings" Canon, XP055527878. Jul. 6, 2017: p. 1-7. Retrieved from the Internet: URL: https://ugp01.c-ij.com/ij/webmanual/Manual/All/TR8500%20series/EN/UG/ug_o_03_03_09.html [retrieved on Nov. 28, 2018], Cited in NPL 2 and 3.

(Continued)

*Primary Examiner* — Omoniyi Obayanju
(74) *Attorney, Agent, or Firm* — Rossi, Kimms & McDowell LLP

(57) ABSTRACT

An information processing apparatus characterized by comprising: at least one wireless communication means capable of executing a plurality of communication modes that include a first communication mode in which the wireless communication means communicates information concerning a predetermined service to be provided to an external apparatus with the external apparatus; basic configuration means for deciding whether to assign an IP address used for a second communication mode different from the first communication mode to the wireless communication means; and communication mode setting means for setting the IP address for the wireless communication means regardless of (Continued)

a decision by the basic configuration means if the first communication mode is enabled.

14 Claims, 11 Drawing Sheets

(51) Int. Cl.
*H04L 61/5007* (2022.01)
*H04L 101/659* (2022.01)
*H04W 84/18* (2009.01)

(56) References Cited

U.S. PATENT DOCUMENTS

| | | | |
|---|---|---|---|
| 2016/0150537 A1* | 5/2016 | Jung | H04W 8/005 |
| | | | 455/452.1 |
| 2016/0253134 A1* | 9/2016 | Nakai | H04L 61/6059 |
| | | | 358/1.15 |
| 2016/0286592 A1* | 9/2016 | Suzuki | G06F 3/1236 |
| 2017/0325230 A1* | 11/2017 | Abraham | H04W 76/14 |
| 2018/0213387 A1 | 7/2018 | Aoki | |
| 2019/0007821 A1* | 1/2019 | Kim | H04L 67/16 |
| 2019/0014609 A1* | 1/2019 | Asakura | H04M 1/72412 |

OTHER PUBLICATIONS

International Search Report issued in Intl Appln No. PCT/JP2018/035685 dated Dec. 12, 2018.
Written Opinion issued in Intl. Appln No. PCT/JP2018/035685 dated Dec. 12, 2018.

* cited by examiner

FIG. 5

501 eth0:
- MAC ADDRESS  12:34:56:78:9a:bc
- ipv4 ADDRESS  219.24.1.1
- ipv6 ADDRESS mlan0:
- MAC ADDRESS  12:34:56:78:9a:c6
- ipv4 ADDRESS  192.168.1.2
- ipv6 ADDRESS wfd0:
- MAC ADDRESS  12:34:56:78:9a:d0
- ipv4 ADDRESS  192.168.1.3
- ipv6 ADDRESS map0:
- MAC ADDRESS  12:34:56:78:9a:da
- ipv4 ADDRESS  192.168.1.4
- ipv6 ADDRESS nan0:
- MAC ADDRESS  12:34:56:78:9a:e4
- ipv4 ADDRESS  192.168.1.5
- ipv6 ADDRESS  fe80::10:34:56:ff:fe:78:9a:e4

502 eth0:
- MAC ADDRESS  12:34:56:78:9a:bc
- ipv4 ADDRESS  219.24.1.1
- ipv6 ADDRESS  fe80::10:34:56:ff:fe:78:9a:bc mlan0:
- MAC ADDRESS  12:34:56:78:9a:c6
- ipv4 ADDRESS  192.168.1.2
- ipv6 ADDRESS  fe80::10:34:56:ff:fe:78:9a:c6 wfd0:
- MAC ADDRESS  12:34:56:78:9a:d0
- ipv4 ADDRESS  192.168.1.3
- ipv6 ADDRESS  fe80::10:34:56:ff:fe:78:9a:d0 map0:
- MAC ADDRESS  12:34:56:78:9a:da
- ipv4 ADDRESS  192.168.1.4
- ipv6 ADDRESS  fe80::10:34:56:ff:fe:78:9a:da nan0:
- MAC ADDRESS  12:34:56:78:9a:e4
- ipv4 ADDRESS  192.168.1.5
- ipv6 ADDRESS  fe80::10:34:56:ff:fe:78:9a:e4

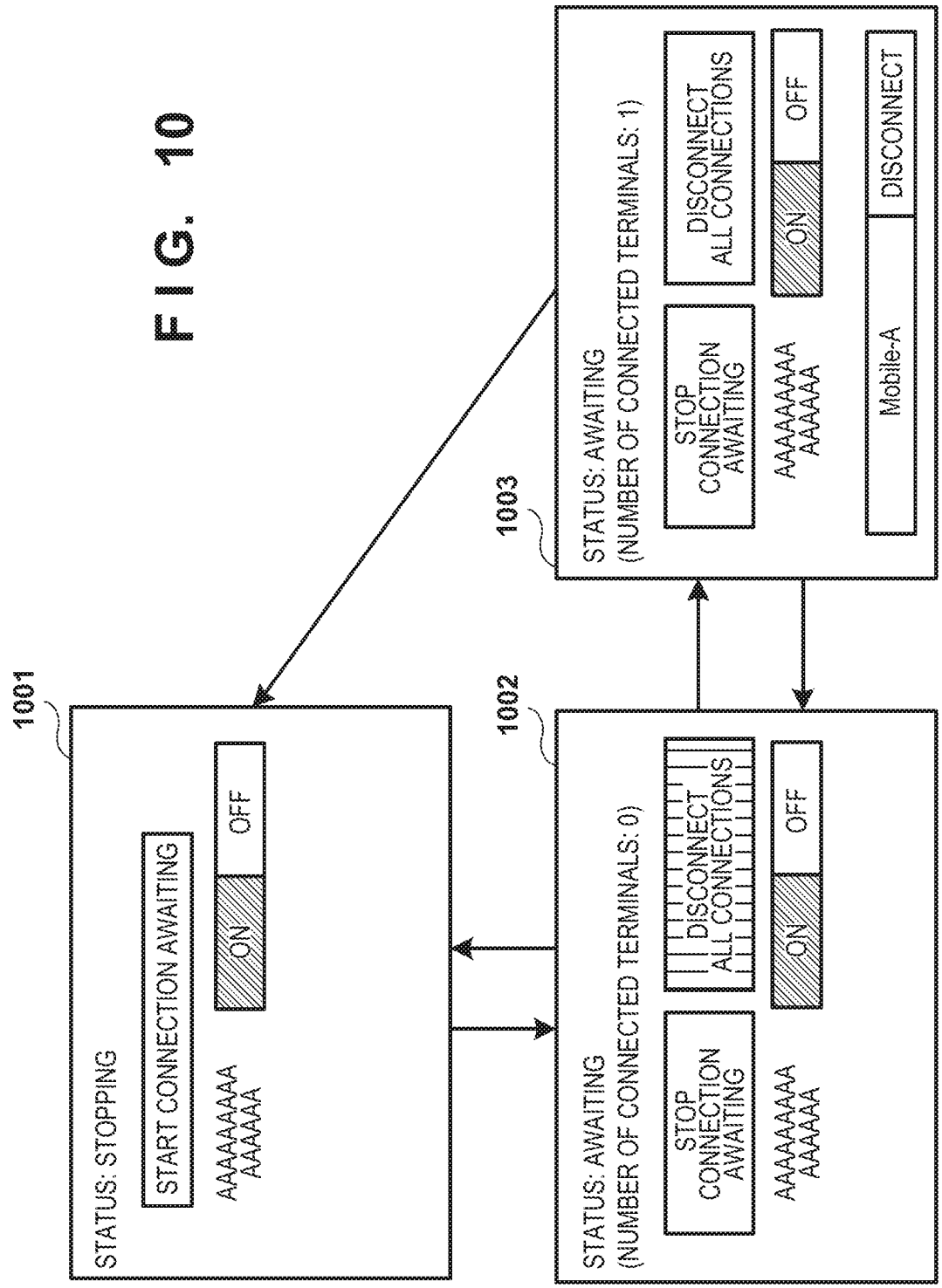

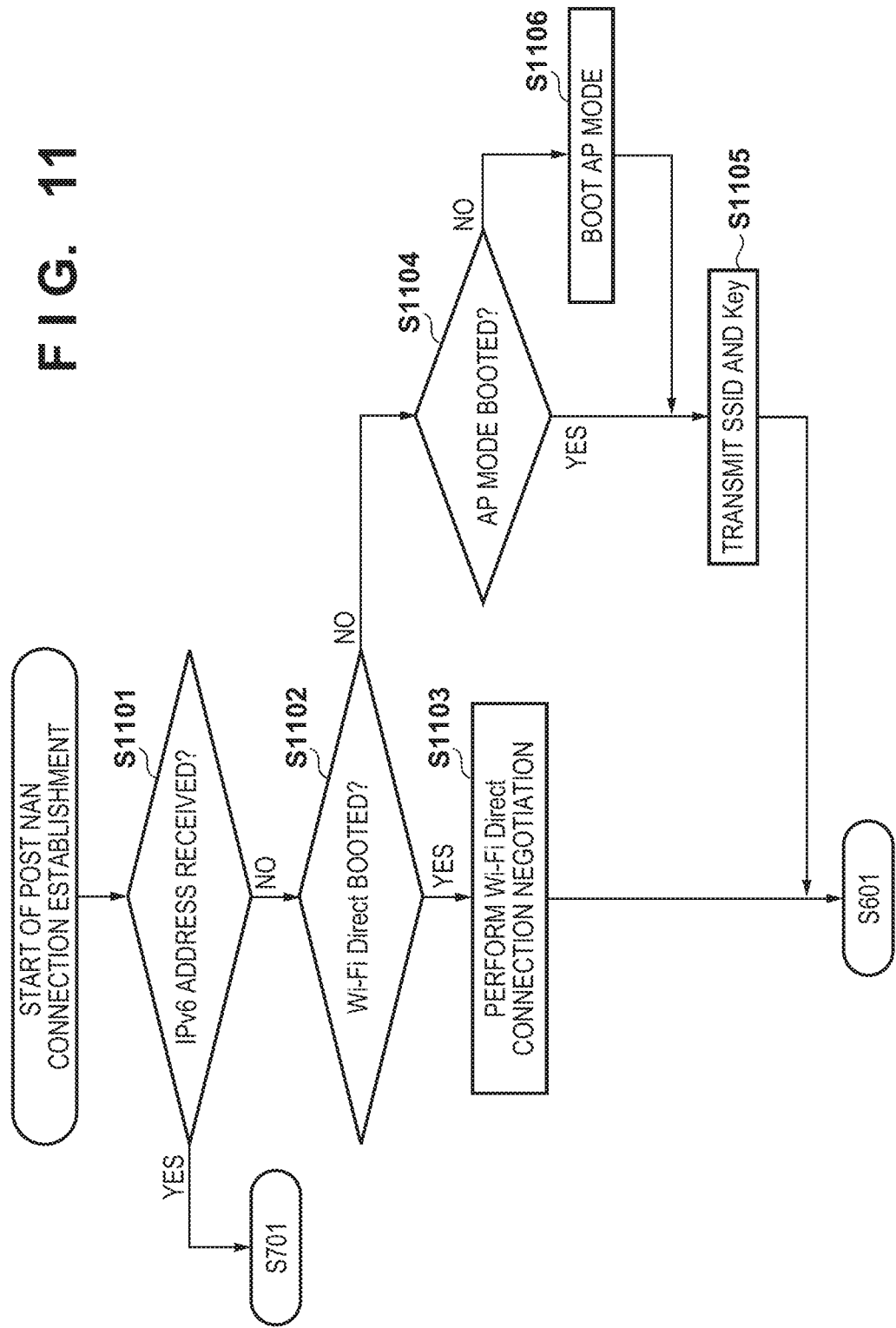

INFORMATION PROCESSING APPARATUS, METHOD OF CONTROLLING THE SAME, AND PROGRAM

TECHNICAL FIELD

The present invention relates to an information processing apparatus, a method of controlling the same, and a program.

BACKGROUND ART

Printing apparatuses such as copying machines and printers which have a wireless LAN function are increasing in number. Each printing apparatus having the wireless LAN function receives print data from an opposite apparatus such as a mobile terminal by wireless communication, and then executes print processing based on the received print data. In order to allow the opposite apparatus to detect the printing apparatus and perform wireless communication, conventionally, for example, communication connection has been performed by the following procedure. That is, using the first communication protocol such as BLE (Bluetooth™ Low Energy), the opposite apparatus detects the printing apparatus and acquires connection information such as an SSID and an IP address of a printing apparatus from the detected printing apparatus. Next, the opposite apparatus establishes communication with the printing apparatus by transferring (so-called handover) the acquired connection information to communication by the second communication protocol such as the IEEE802.11 standard and performs, for example, transmission of a print job.

Moreover, conventionally, in Wi-Fi Aware as a certified program of Wi-Fi Alliance, NAN (Neighbor Awareness Networking) capable of detecting a service provided by a neighbor terminal has been defined. Japanese Patent Laid-Open No. 2017-63312 discloses a communication apparatus that detects a chat service by using NAN, then establishes a data link, and executes a chat application.

In the above-described communication procedure, communication protocols of a plurality of different standards are used for communication between the opposite apparatus and the printing apparatus, requiring processing such as handover processing. Furthermore, if communication between the opposite apparatus and the printing apparatus is performed by using NAN, it becomes possible to perform, for example, communication of the print job from detection of the printing apparatus by a Wi-Fi standard. In this case, however, the following additional problem arises. That is, in order to actually perform a service such as printing or scanning, it is essential to transmit/receive print data or scan data of a comparatively large size. This needs separate establishment of wireless connection. Establishment of wireless connection in order to execute the service by NAN will be referred to as post NAN. At this time, for example, P2P connection is used, which uses IPv6 for allowing an apparatus in question to decide its own address by itself.

In a case in which the printing apparatus is set so as to disable IPv6, however, it is neither possible to establish wireless connection by post NAN nor implement the service itself even if the service is detected by using NAN. In addition, also in a case in which the opposite apparatus does not support the post NAN connection, it is neither possible to establish the post NAN connection nor implement the service itself even if the service is detected by using NAN.

SUMMARY OF INVENTION

The present invention enables realization of a mechanism for appropriately setting, by NAN, a communication method needed for a printing apparatus to execute a service such as printing or scanning by post NAN.

One aspect of the present invention provides an information processing apparatus characterized by comprising: at least one wireless communication means capable of executing a plurality of communication modes that include a first communication mode in which the wireless communication means communicates information concerning a predetermined service to be provided to an external apparatus with the external apparatus; basic configuration means for deciding whether to assign an IP address used for a second communication mode different from the first communication mode to the wireless communication means; and communication mode setting means for setting the IP address for the wireless communication means regardless of a decision by the basic configuration means if the first communication mode is enabled.

Further features of the present invention will become apparent from the following description of exemplary embodiments (with reference to the attached drawings).

BRIEF DESCRIPTION OF DRAWINGS

FIG. 5 is a view showing an example of IP address tables assigned to the printing apparatus 100 according to the embodiment;

FIG. 10 is a block diagram showing screens for changing a NAN configuration, which are displayed on an operation unit 209 of a printing apparatus 100 according to an embodiment; and FIG. 11 is a flowchart showing post NAN connection establishment processing of a printing apparatus 100 according to an embodiment.

DESCRIPTION OF EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

NAN Cluster

Figure 1:
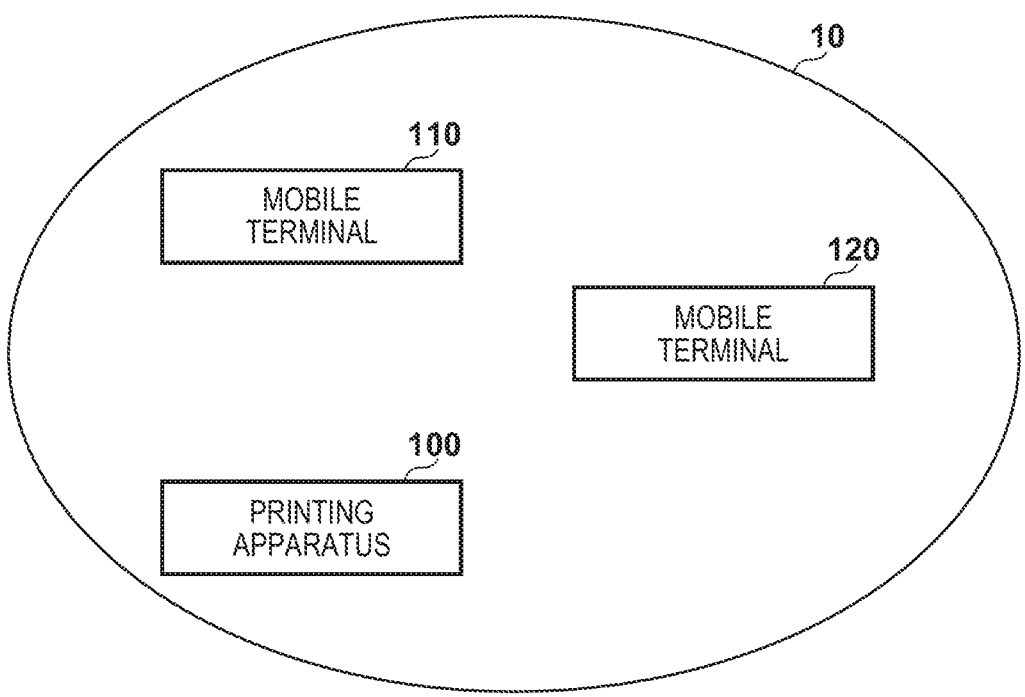
FIG. 1 is a block diagram showing a NAN cluster formed by a terminal group.

First, NAN will be described with reference to a schematic view of FIG. 1. Each of a printing apparatus 100, and mobile terminals 110 and 120 shown in FIG. 1 includes a wireless interface complying with NAN. In this specification, the printing apparatus and the mobile terminals will collectively be referred to as a terminal.

A terminal group transmits/receives service information during a period called a discovery window (to be referred to as a DW period hereinafter). The terminal group that shares a schedule in this DW period will be referred to as a NAN cluster. Note that the DW period is a period of a predetermined length which is repeated in a predetermined cycle. For example, the cycle is 512 msec, and the length of the period is 16 msec.

Each terminal in a NAN cluster 10 plays one of master, non-master synch, and non-master non-sync roles. Note that the role played by each of a plurality of terminals may change dynamically. Alternatively, the plurality of terminals may play each role. Note that in each NAN cluster, at least one terminal operates as the master. A terminal operating as the master indicates a terminal that transmits both a discovery beacon to be described later and a synchronization beacon to be described later as well. A terminal operating as the non-master sync indicates a terminal which does not transmit the discovery beacon but transmits the synchronization beacon. A terminal operating as the non-master non-synch indicates a terminal which transmits neither the discovery beacon nor the synchronization beacon. The discovery beacon is a signal transmitted outside the DW period in order to notify a neighbor terminal which does not join the NAN cluster of the existence of the NAN cluster. The synchronization beacon is a signal transmitted within the DW period in order to establish synchronization between the terminals in the NAN cluster.

By the above-described method, the respective terminals joining the NAN cluster 10 perform communication for forming and maintaining the NAN cluster. The respective terminals joining the NAN cluster communicate, in the DW period, a subscribe signal serving as a signal for detecting or requesting a service and a publish signal serving as a signal for making a notification that a service is provided with each other. Furthermore, the respective terminals can exchange a follow-up signal for exchanging additional information concerning a service in the DW period. The service may include, for example, a scan service or a print service for printing data on paper.

The subscribe signal includes, in a signal, a character string representing a service to be searched by a terminal of a transmission source (to be referred to as a service name hereinafter). If the service is the print service, the character string is, for example, "PRINT-0001". A terminal capable of providing a service transmits, to a NAN cluster to which the terminal belongs, a publish signal for making a notification that a service can be provided within the DW. The publish signal includes, in a signal, a service name representing a service to be provided.

When a terminal that searches for a service receives a publish signal, the terminal can detect the service if a service name included in the signal matches the service name searched by the terminal. When a terminal that provides a service receives a subscribe signal, the terminal can transmit a publish signal in order to make a notification about the service if a service name included in the signal matches the service name provided by the terminal. By this publish signal, the terminal that has transmitted the subscribe signal can discover a service. An operation mode in which a terminal that provides a service does not transmit a publish signal until it receives a subscribe signal will be referred to as a solicited mode. In addition, an operation mode in which a terminal that provides a service transmits a publish signal at a predetermined interval even if it, does not receive a subscribe signal will be referred to as an unsolicited mode or a continuous notification mode.

Establishment of wireless connection for executing a service or an application after a NAN device detects the service or the application will be referred to as post NAN. In post NAN, the service or the application is provided by using a network different from the NAN cluster, for example, a network such as P2P connection, an infrastructure network, Wi-Fi Direct, or the like. The NAN device can establish a new network and transmit/receive data concerning the service or application.

First Embodiment

The first embodiment of the present invention will be described below. In this embodiment, a printing apparatus will be described, which makes a service notification by using NAN, transmits/receives information needed to execute a service via post NAN connection with an opposite terminal that has requested the service, and executes the service. Note that in this embodiment, post NAN connection started by NAN is P2P connection using IPv6.

Arrangement of Printing Apparatus

Figure 2:
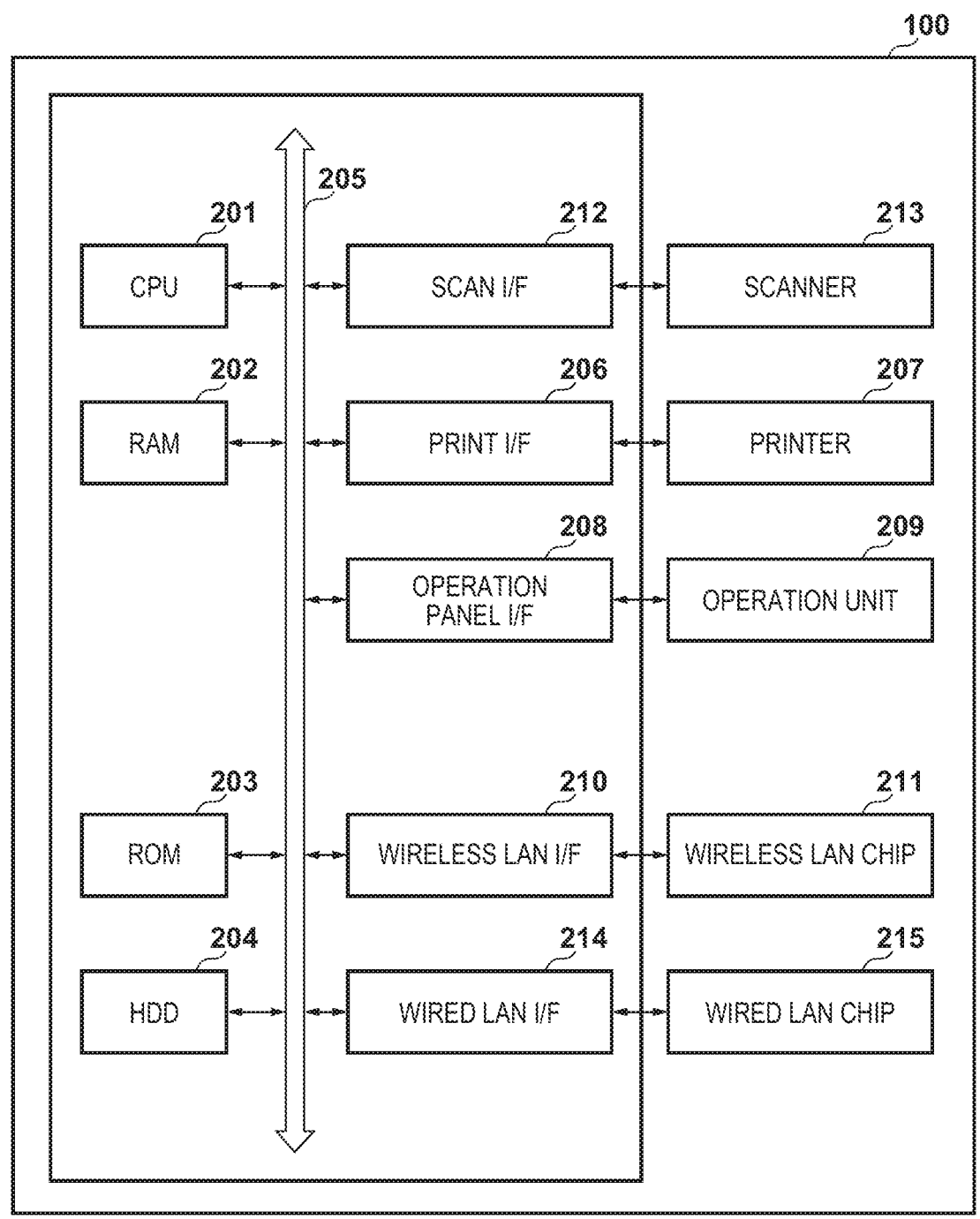
FIG. 2 is a block diagram showing the hardware arrangement of a printing apparatus 100 according to an embodiment.

FIG. 2 is a block diagram showing the hardware arrangement of a printing apparatus 100 serving as an information processing apparatus. Respective constituent elements that form the printing apparatus 100 perform communication via a system bus 205. A CPU 201 reads out a control program stored in a ROM 203 and executes various processes for controlling the operation of the printing apparatus 100. A RAM 202 is used as a temporary storage area such as a main memory or work area of the CPU 201. An HDD 204 stores various data such as print data and scan data. Note that as the HDD 204, a storage medium such as a hard disk, a flexible disk, an optical disk, a magnetooptical disk, a CD-ROM, a CD-R, a magnetic tape, a nonvolatile memory card, or a DVD may be used. The printing apparatus 100 also includes a printer 207 connected to the system bus 205 via a print interface (I/F) 206 and an operation unit 209 connected to the system bus 205 via an operation panel I/F 208. The printing apparatus 100 also includes a wireless LAN chip 211 connected to the system bus 205 via a wireless LAN I/F 210, a scanner 213 connected to the system bus 205 via a scan I/F 212, and a wired LAN chip 215 connected to the system bus 205 via a wired LAN I/F 214.

The printer 207 executes printing processing based on print data received from an external apparatus via the wireless LAN chip 211 or the wired LAN chip, scan data generated by the scanner 213, data stored in the HDD 204, or the like. The scanner 213 generates scan data (read image data) by reading an original. The generated scan data is transmitted to the external apparatus via the wireless LAN chip 211 or the wired LAN chip, used for printing by the printer 207, or stored in the HDD 204. The operation unit 209 functions as a display control unit, includes a liquid crystal display unit having a touch panel function or a keyboard, and displays various screens to be described later. A user can input an instruction or information to the printing apparatus 100 via the operation unit 209. The wireless LAN I/F 210 communicates with an external apparatus such as a mobile terminal or a PC terminal via the wireless LAN chip 211. A wireless LAN has an access point mode or an operation mode such as wireless Direct and NAN. The wireless LAN I/F 210 includes a plurality of virtual interfaces to be described later. The wired LAN I/F 214 may include Ethernet™ connection.

Operation Screen Example

Figure 3:
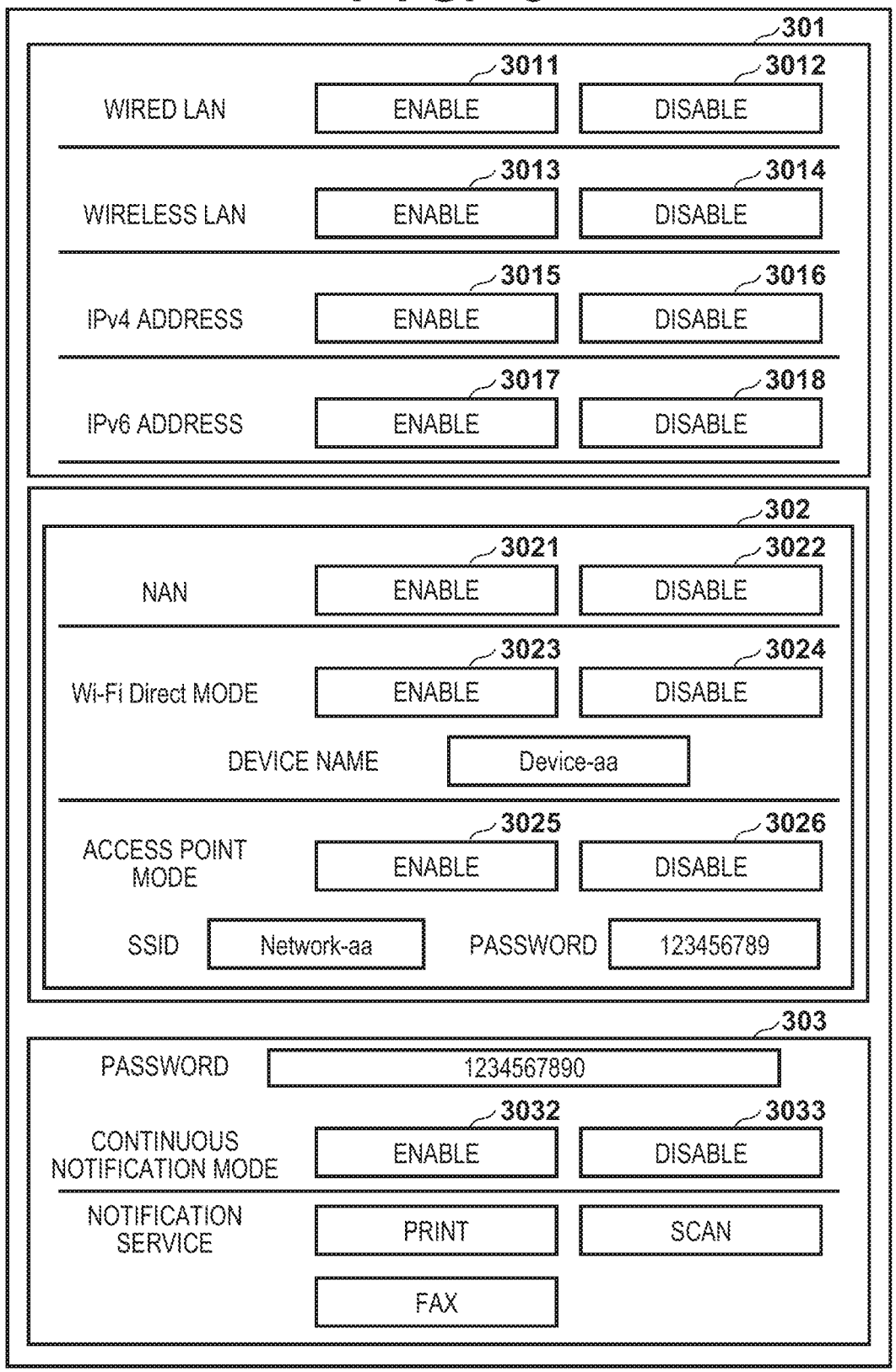
FIG. 3 is a block diagram showing an operation screen of the printing apparatus 100 according to the embodiment.

FIG. 3 shows a basic configuration screen 301 where the basic operation of the printing apparatus 100 is set. A wired LAN can select one of "enable" 3011 and "disable" 3012. If the "enable" 3011 is selected in the configuration, the wired LAN interface 214 executes communication via the wired LAN chip 215. The same also applies to the wireless LAN. If the wired LAN or the wireless LAN is set enabled, an IPv4 address can also select "enable" 3015 or "disable" 3016. If the "enable" 3015 is selected in the configuration, the IPv4 address is set for each interface which is set enabled. The IPv4 address may be decided by a DHCP server of a network to which each interface belongs. Alternatively, the CPU 201 may decide the IPv4 address of each interface by an Auto IP. The same also applies to an IPv6 address. As the IPv6 address, however, a link local address corresponding to a corresponding one of MAC addresses may be set for each interface.

FIG. 3 shows an example of a wireless LAN configuration screen 302 where a configuration concerning the wireless LAN of the printing apparatus 100 is performed. NAN can select one of "enable" 3021 and "disable" 3022. If the "enable" 3021 is selected, the wireless LAN interface 210 executes the aforementioned NAN. The details of an operation will be described later. A Wi-Fi Direct mode can also set one of "enable" 3023 and "disable" 3024 in the same manner. If the "enable" 3023 is selected, the Wi-Fi Direct mode is enabled in the printing apparatus 100. Note that the Wi-Fi Direct mode is an operation mode in which wireless communication is performed directly between the printing apparatus 100 and the opposite apparatus by using Wi-Fi Direct normalized by Wi-Fi Alliance. A "device name" is a name used at the time of a Wi-Fi Direct operation, and an arbitrary character string can be set. An access point mode (to be referred to as an AP mode hereinafter) can select one of "enable" 3025 and "disable" 3026 if the Wi-Fi Direct mode is set "disabled". For example, the AP mode can be a mode for complying with the IEEE802.11 standard and operating as an access point (AP) in an infrastructure mode. If the "enable" 3025 is selected, the printing apparatus 100 operates as an AP, and the external apparatus can perform wireless communication with the printing apparatus 100 directly by wirelessly being connected to the AP. An SSID and a password are an area for setting an SSID and a password which can be set only in a case where an AP mode is enabled, and which are used for connection to the AP. The wireless LAN configuration screen 302 may further include a configuration form for 1 time SSID/password. If the configuration form is set enabled, the configuration of the SSID and password is disabled, and an SSID and a password are generated randomly each time the AP mode is started. Note that the Wi-Fi Direct mode and the AP mode may be set regardless of a NAN configuration.

FIG. 3 shows an example of a NAN configuration screen 303 where a configuration concerning NAN of the printing apparatus 100 is performed. A password 3031 on the NAN configuration screen 303 can set an arbitrary character string. The password is used for post NAN connection to be described later. A continuous notification mode can set one of "enable" 3032 and "disable" 3033. Details concerning the continuous notification mode will be described later. A notification service can set one of "enable" and "disable" for each of "print", "scan", and "FAX". The notification service is a service transmitted by the printing apparatus 100 and included in a publish signal in NAN. That is, the notification service is a service whose notification that it can be provided to a neighbor terminal is made by the printing apparatus 100. If NAN is set disabled, it may be impossible to change any configuration of the NAN configuration screen 303. Alternatively, even if NAN is set disabled, it may be possible to change one of the configurations of the NAN configuration screen 303. In this case, a change in configuration may be reflected at the time of boot processing to be described later. For example, a message for notifying the user that NAN is set disabled may be displayed on the operation unit 209. Moreover, if the configuration is changed, a message for prompting reflection of the configuration by, for example, reboot of the printing apparatus 100, wireless LAN chip 211, or NAN may be displayed on the operation unit 209 to confirm whether an operation intended by the user is performed.

Boot Processing

Figure 4:
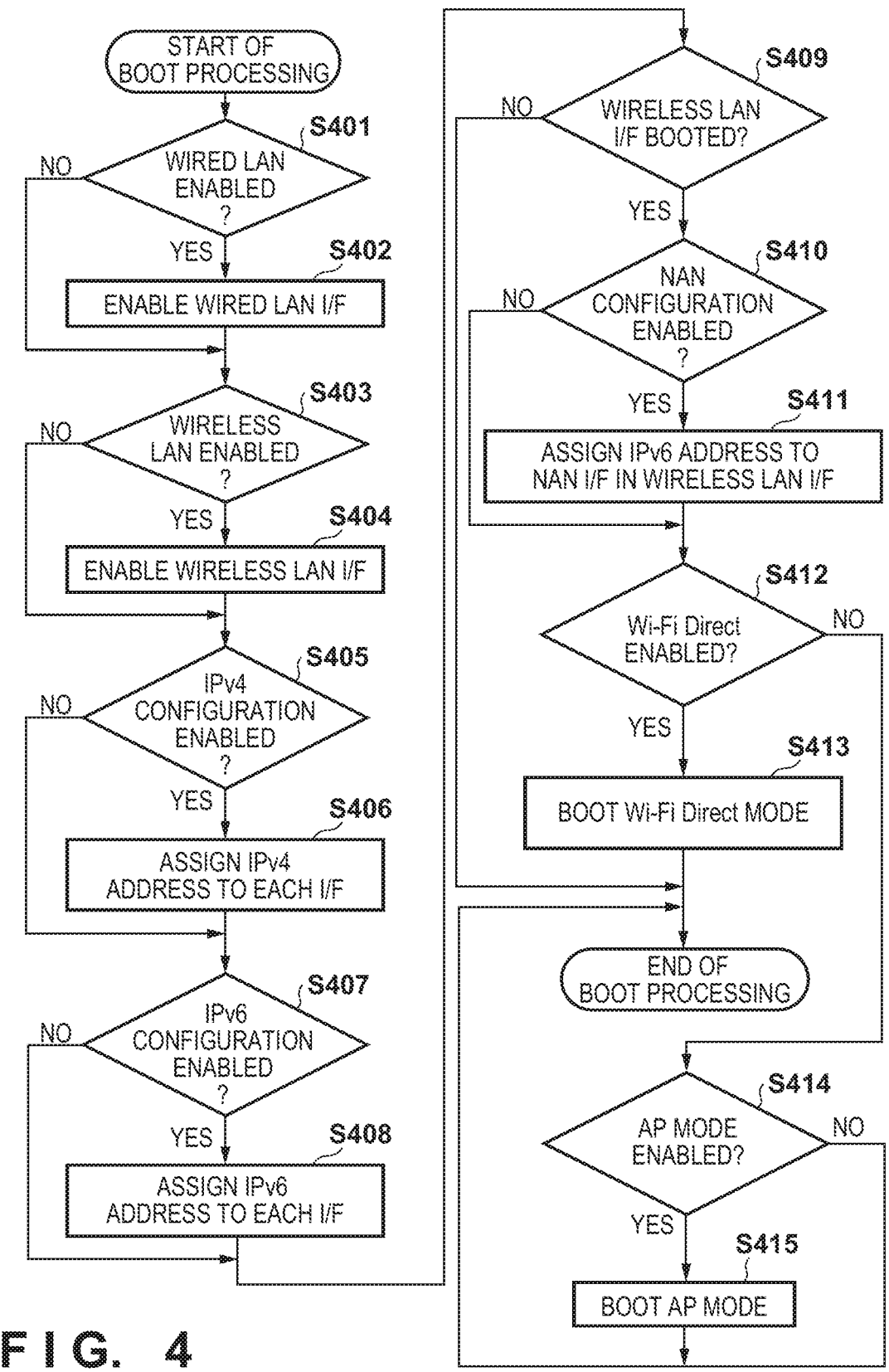
FIG. 4 is a flowchart showing boot processing of the printing apparatus 100 according to the embodiment.

Boot processing of the printing apparatus 100 will be described next with reference to a flowchart in FIG. 4. When the printing apparatus 100 is powered on, in step S401, the CPU 201 determines whether a wired LAN configuration is enabled or disabled with reference to a basic configuration set by using the basic configuration screen 301 or the like. If the configuration is enabled, the process advances to step S402 in which the CPU 201 enables the wired LAN interface 214. Subsequently, in step S403, the CPU 201 determines whether a wireless LAN configuration is enabled or disabled. If the configuration is enabled, in step S404, the CPU 201 may enable all virtual interfaces of the wireless LAN interface 210. Alternatively, the printing apparatus 100 may be configured to be able to select, in advance, a virtual interface to be enabled at the time of boot and may enable only the virtual interface set enabled based on the configuration in step S404. Note that enabling of an interface is a process of perform enabling up to a data link layer of the interface so that communication can be performed.

Next, in step S405, the CPU 201 determines whether an IPv4 configuration is enabled or disabled. If the configuration is enabled, the process advances to step S406 in which the CPU 201 sets an IPv4 address for an enabled interface out of the wired LAN interface 214 and the wireless LAN interface 210. Subsequently, in step S407, the CPU 201 determines whether an IPv6 configuration is enabled or disabled. If the configuration is enabled, the process advances to step S408 in which the CPU 201 sets an IPv6 address for the enabled interface out of the wired LAN interface 214 and the wireless LAN interface 210.

Subsequently, in step S409, the CPU 201 determines whether the wireless LAN interface 210 is enabled or disabled. If the CPU 201 determines that the wireless LAN interface 210 is disabled, the boot processing of the printing apparatus 100 is completed. If the CPU 201 determines in step S409 that the wireless LAN interface is enabled, the process advances to step S410 in which the CPU 201 determines whether a NAN configuration is enabled or disabled. If the CPU 201 determines that the NAN configuration is enabled, the process advances to step S411 in which the CPU 201 sets an IPv6 address to a NAN interface of the wireless LAN interface 210. Note that the CPU 201 is an example of a communication mode setting unit. Note that if the NAN interface is not enabled in step S404, the NAN interface may be enabled, and an IP address may be assigned in step S411. Note that step S411 is executed regardless of whether step S408 is executed. In other words, regardless of whether the IPv6 configuration is enabled or disabled, the IPv6 address is set for the NAN interface in step S411. By thus setting the IPv6 address for the NAN interface forcibly, it is possible to appropriately set a communication method needed for the printing apparatus to execute a service such as printing or scanning by NAN.

Subsequently, in step S412, the CPU 201 determines whether the Wi-Fi Direct mode is enabled or disabled. If the CPU 201 determines that the Wi-Fi Direct mode is enabled, the Wi-Fi Direct mode is booted in step S413, and the printing apparatus 100 completes the boot processing. If the CPU 201 determines in step S412 of the wireless LAN I/F that the Wi-Fi Direct mode is disabled, it determines in step S414 whether the AP mode is enabled or disabled. If the CPU 201 determines that the AP mode is disabled, the printing apparatus 100 completes the boot processing. If the CPU 201 determines in step S414 that the AP mode is enabled, the process advances to step S415 in Which the CPU 201 boots the AP mode, and the printing apparatus 100 completes the boot processing.

Note that the above-described boot processing may not be executed in the described order. For example, processes in steps S401 and S402 may be executed after processes in steps S403 and S404. Alternatively, processes in steps S405 and S406 may be executed after processes in steps S407 and S408. Alternatively, if the CPU 201 determines in step S410 that the NAN configuration is disabled, or if the CPU 201 determines in step S414 whether the AP mode is enabled or disabled following step S411, and the AP mode is enabled, step S415 may be executed, and if the AP mode is disabled, step S412 may be executed. In this case, the process may advance to step S413 if the CPU 201 determines in step S412 that the Wi-Fi Direct mode is enabled, and the boot processing may be terminated if the CPU 201 determines that the Wi-Fi Direct mode is disabled.

Status of Interface

A change in status of each interface will be described here with reference to FIG. 5. An address table 501 shows an IP address assignment condition of each interface in a case in which steps S402, S404, S406, and S411 are executed. In other words, the address table 501 represents the IP address assignment condition of each interface if the respective configurations in steps S401, S403, S405, and S410 are enabled, and the CPU 201 determines in step S407 that the IPv6 configuration is disabled. In the address table 501, eth0 represents a wired LAN interface, mlan0 represents a virtual interface used for wireless LAN infrastructure communication, wfd0 represents a virtual interface used for the Wi-Fi Direct mode, map0 represents a virtual interface for a wireless LAN AP mode, and nan0 represents a virtual interface used for NAN. These virtual interfaces are virtual interfaces in the wireless LAN interface and can have MAC addresses, IPv4 addresses, and IPv6 addresses different from each other. In the address table 501, the IPv4 address is assigned to each interface, and the IPv6 address is assigned to only the NAN interface.

An address table 502 represents an IP address assignment condition of each interface in a case in which steps S402, S404, S406, S408, and S411 are executed. In the address table 502, IPv4 addresses and IPv6 addresses are assigned to all the interfaces.

Note that to wfd0 and map0, the IPv4 addresses are assigned in the address table 501, and the IPv4 addresses and the IPv6 addresses are assigned in the address table 502. However, if the Wi-Fi Direct mode or the AP mode is set disabled, neither the IPv4 addresses nor the IPv6 addresses may be set.

Processing Procedure

Figure 6:
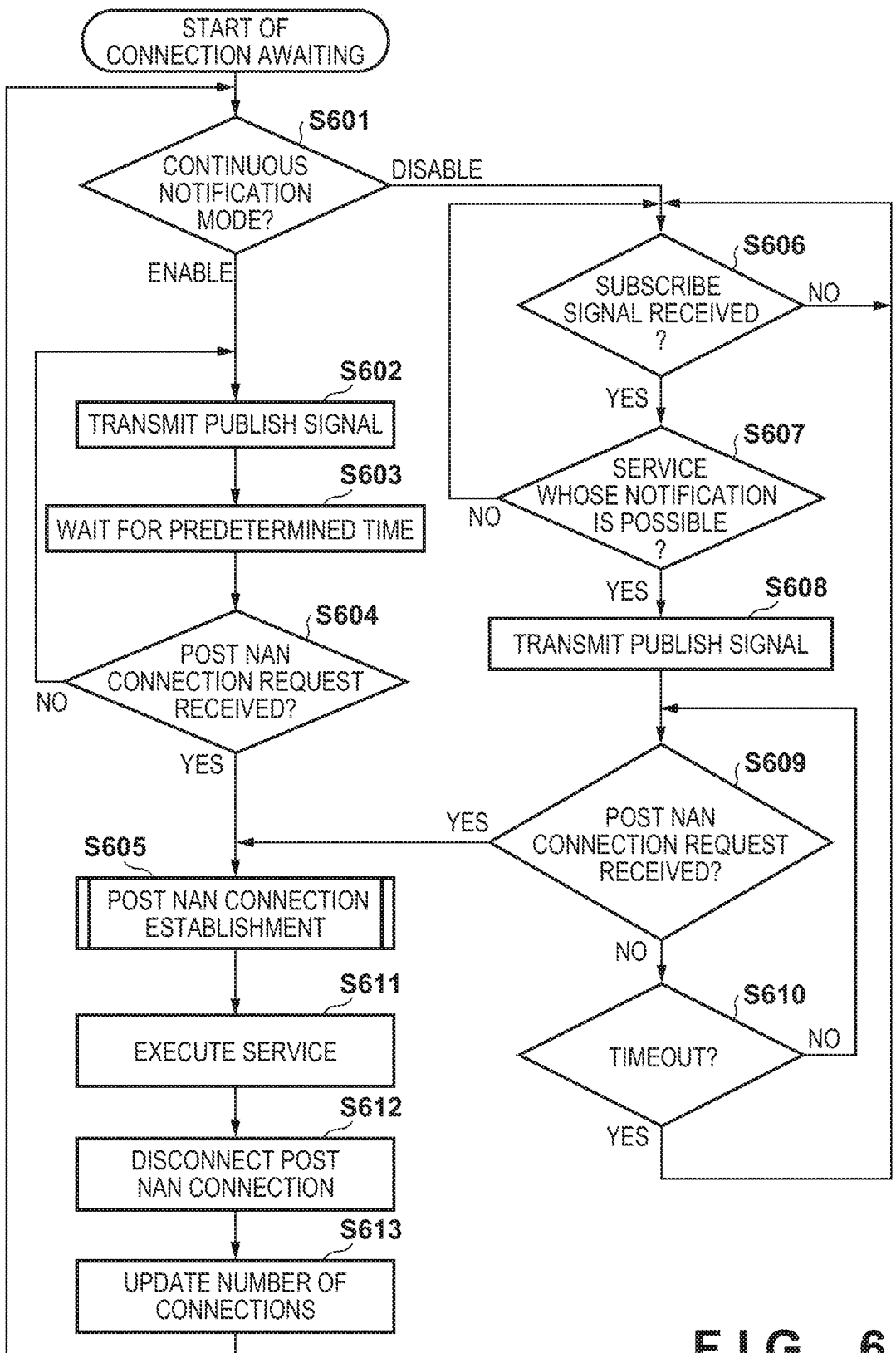
FIG. 6 is a flowchart showing processing for NAN and post NAN performed by the printing apparatus 100 according to the embodiment.

The boot processing of the printing apparatus 100 has been described so far. After the completion of the boot processing, the printing apparatus 100 starts a service notification and connection awaiting if NAN is enabled. Subsequently, the printing apparatus 100 establishes post NAN connection in accordance with a post NAN connection request from the external apparatus. Communication of these will be described below with reference to a flowchart in FIG. 6. The processing to be described below is implemented when, for example, the CPU 201 loads a control program stored in the ROM 203 or the HDD 204 into the RAM 202 and executes it.

In step S601, the CPU 201 determines whether the continuous notification mode is enabled or disabled. If the CPU 201 determines that the continuous notification mode is enabled, the process advances to step S602 in which the CPU 201 transmits a publish signal via the wireless LAN chip 211. At this time, the publish signal includes a service name corresponding to a notification service set enabled on the NAN configuration screen 303. If a plurality of notification services are enabled, they are switched to another notification service with a service name included in the publish signal being set enabled each time the signal is transmitted. In other words, a notification of a plurality of services are made time-divisionally. Subsequently, in step S603, the CPU 201 waits for a predetermined time. The predetermined time is a predetermined interval between a DW and a next DW. Subsequently, in step S604, the CPU 201 determines whether a post NAN connection request is received via the wireless LAN interface 210. The post NAN connection request can be, for example, a post NAN connection request from an opposite terminal and include an IPv6 address of the opposite terminal. If the post NAN connection request is received, the process advances to step S605; otherwise, the process returns to step S602.

If the CPU 201 determines in step S601 that the continuous notification mode is disabled, the process advances to step S606 in which the CPU 201 waits until a subscribe signal from the opposite terminal is received via the wireless LAN interface 210. If the subscribe signal is received, the process advances to step S607 in which the CPU 201 determines whether a service name included in the received subscribe signal and a service name corresponding to a notification service set enabled are the same. If the CPU 201 determines that they are not the same, the process advances to step S606 in which the CPU 201 waits for reception of the subscribe signal. If the CPU 201 determines that they are the same, the CPU 201 transmits a publish signal which includes the service name via the wireless LAN chip 211 in step S608.

Subsequently, in step S609, the printing apparatus 100 determines whether the post NAN connection request is received via the wireless LAN interface 210. If the post NAN connection request is not received, the process advances to step S610. In step S610, the CPU 201 returns to step S609 unless a timeout occurs and waits until the post NAN connection request is received. If the post NAN connection request is not received for a predetermined time, the CPU 201 determines in step S610 that the timeout occurs and advances to step S606 in which it waits for reception of the subscribe signal. The predetermined time is a predetermined arbitrary value and is, for example, five sec. In step S609, if the CPU 201 receives the post NAN connection request via the wireless LAN interface 210, the process returns to step S605. The post NAN connection request can be a post NAN connection request from an opposite terminal that has transmitted the subscribe signal and include an IPv6 address of the opposite terminal.

Figure 7:
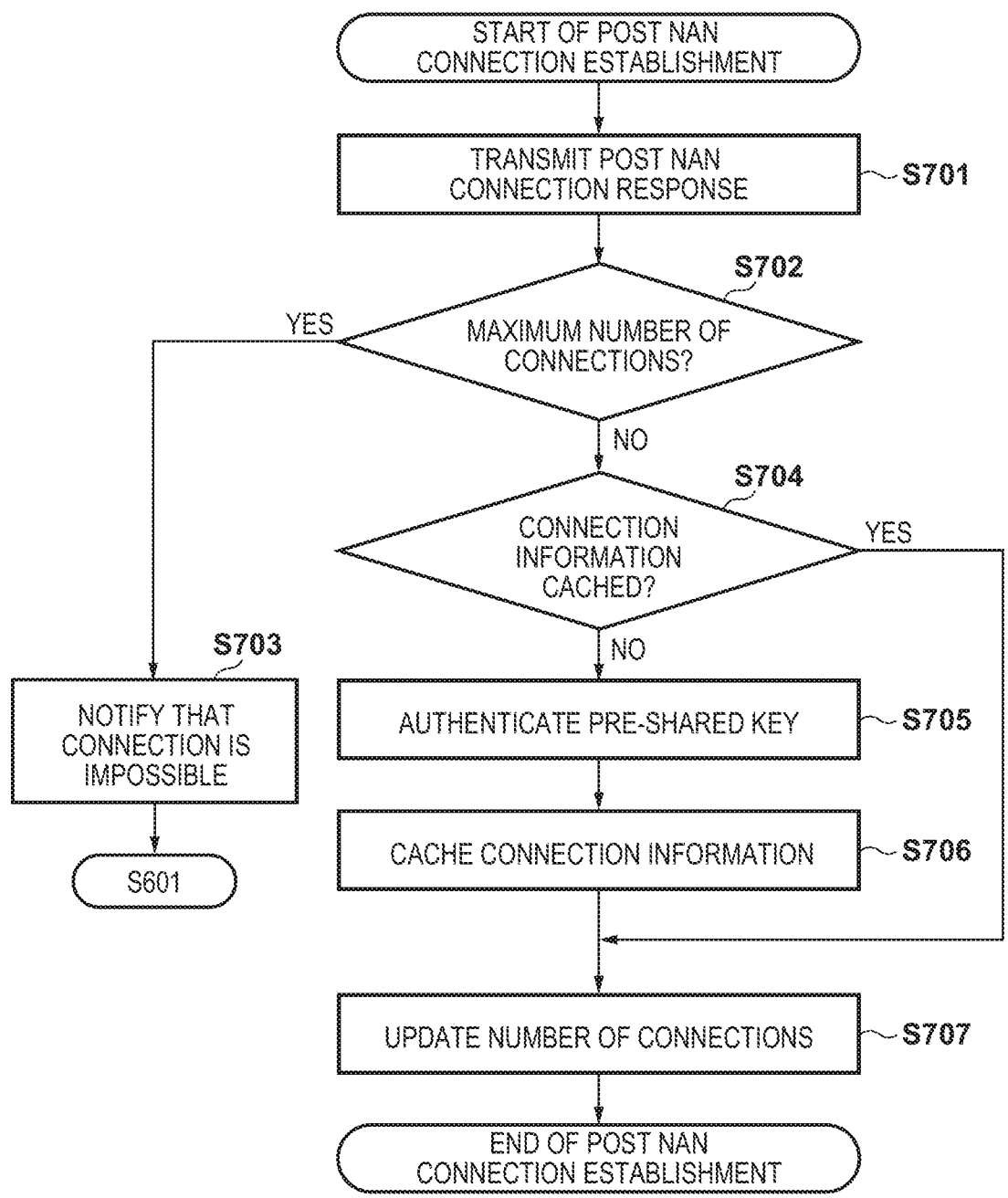
FIG. 7 is a flowchart showing post NAN connection establishment processing performed by the printing apparatus 100 according to the embodiment.

An example of the details of post NAN connection processing in step S605 will be described here with reference to a flowchart in FIG. 7.

In step S701, the CPU 201 transmits a post NAN connection response to the opposite terminal. The response may include an IPv6 address of the printing apparatus 100. Subsequently, in step S702, the CPU 201 determines whether the number of terminals currently set in post NAN connection is the maximum number of connections. The maximum number of connections is, for example, five. If the number of terminals in post NAN connection is the maximum number of connections, the printing apparatus 100 advances to step S703 in which it notifies the opposite terminal that connection is impossible, terminates the post NAN connection processing, and returns to step S601.

In step S702, if the CPU 201 determines that the number of terminals currently set in post NAN connection is smaller than the maximum number of connections, the CPU 201 advances to step S704 in which it determines whether information on the opposite terminal is cached and advances to step S707 if it determines that the information is cached. In step S704, if the CPU 201 determines that the information on the opposite terminal is not cached, the process advances to step S705 in which the printing apparatus 100 and the opposite terminal perform authentication by using a pre-shared key. The pre-shared key is a password set on the NAN configuration screen 303. Subsequently, in step S706, the CPU 201 caches the information on the opposite terminal to the RAM 202, the ROM 203, or the HDD 204. Subsequently, in step S707, the CPU 201 increases the number of current connections by one and terminates the post NAN connection processing.

Referring back to FIG. 6, following step S605, the printing apparatus 100 advances to step S611. In parallel, however, the printing apparatus 100 may return to step S601, and continue to perform, for the other opposite terminal, a service notification and a post NAN connection establishment sequence described so far. In step S611, the printing apparatus 100 executes a service corresponding to the service name included in the publish signal. The service name may be the same as the service name which is included in the subscribe signal transmitted by the opposite terminal.

A service is, for example, a print service. In this case, the printing apparatus 100 receives print job data from the opposite terminal. The job data is job data that includes contents of print data formed by a document or a picture, and printing configurations such as a single-sided or double-sided configuration and a monochrome or color configuration. The printing apparatus 100 prints print data in accordance with the printing configurations included in the received job data. Alternatively, a service is a scan service. In this case, the printing apparatus 100 scans contents of a document sheet placed in its scan tray, generates image data, and transmits it to the opposite terminal. Alternatively, a service is a FAX service. In this case, the printing apparatus 100 receives destination information serving as a FAX destination from the opposite terminal, scans the contents of the document sheet placed in the scan tray of the printing apparatus 100, and FAX-transmits generated image data to the destination. Alternatively, the printing apparatus 100 receives FAX job data from the opposite terminal. The job data is job data that includes contents of FAX data formed by a document or a picture, destination information serving as a FAX destination, and a printing configuration. The printing apparatus 100 FAX-transmits print data to a destination by using a printing configuration included in received job data.

Subsequently, in step S612, the printing apparatus 100 disconnects the post NAN connection with the opposite terminal. That is, the printing apparatus 100 disconnects the post NAN connection each time service execution ends. In step S612, the post NAN connection between the printing apparatus 100 and the opposite terminal is disconnected. However, if the printing apparatus 100 does not receive communication from the opposite terminal in a predetermined period, it may disconnect the post NAN connection. In addition, the printing apparatus 100 may disconnect the post NAN connection if it determines that it is moved away from the opposite terminal at a predetermined distance or more when, for example, a radio reception intensity from the opposite terminal becomes a predetermined value or less. Subsequently, in step S613, the printing apparatus 100 updates the number of connections and returns to step S601.

According to this embodiment, detection of the printing apparatus is started by using NAN in accordance with a standard such as Wi-Fi Aware, and a print job is communicated by Wi-Fi Direct communication. It is possible to perform an operation from detection of the printing apparatus to execution of printing in accordance with a Wi-Fi standard, thus making so-called handover processing unnecessary. It is therefore possible to reduce a processing load of connection processing in the printing apparatus 100. Moreover, as described above, according to this embodiment, the information processing apparatus includes at least one wireless communication unit capable of executing a plurality of communication modes that includes the first communication mode in which it communicates information concerning a predetermined service with an external apparatus. Furthermore, this information processing apparatus decides whether to assign, to the wireless communication unit, an IP address which is used for the second communication mode different from the first communication mode and sets the IP address for the wireless communication unit regardless of the above-described decision if the first communication mode is enabled. This makes it possible to set an IP address needed to provide a post NAN service whose notification is made by NAN, allowing even a user who is not familiar to a communication technique to set an information processing apparatus appropriately. Furthermore, if IPv6 addresses are not unnecessarily assigned to interfaces which do not use the IPv6 addresses, a security measure according to an IPv6 environment need not additionally be introduced to those interfaces. This facilitates management of the information processing apparatus and makes it possible to reduce cost of the management.

Second Embodiment

The second embodiment of the present invention will be described below. In this embodiment, a printing apparatus 100 capable of operating so as to permit or refuse connection of an opposite terminal for which a user requests post NAN connection via an operation unit 209 of the printing apparatus 100, or which is in post NAN connection will be described. The hardware arrangement of the printing apparatus 100 according to this embodiment is the same as that of the printing apparatus 100 shown in FIG. 2, and thus a description thereof will be omitted. Moreover, in boot processing, a service providing notification, post NAN connection processing, and service execution processing performed by the printing apparatus 100 according to this embodiment, the same reference numerals denote those performing the same processing as the printing apparatus 100 according to the above-described first embodiment, a description thereof will be omitted, and only a difference will be described.

Figure 8:
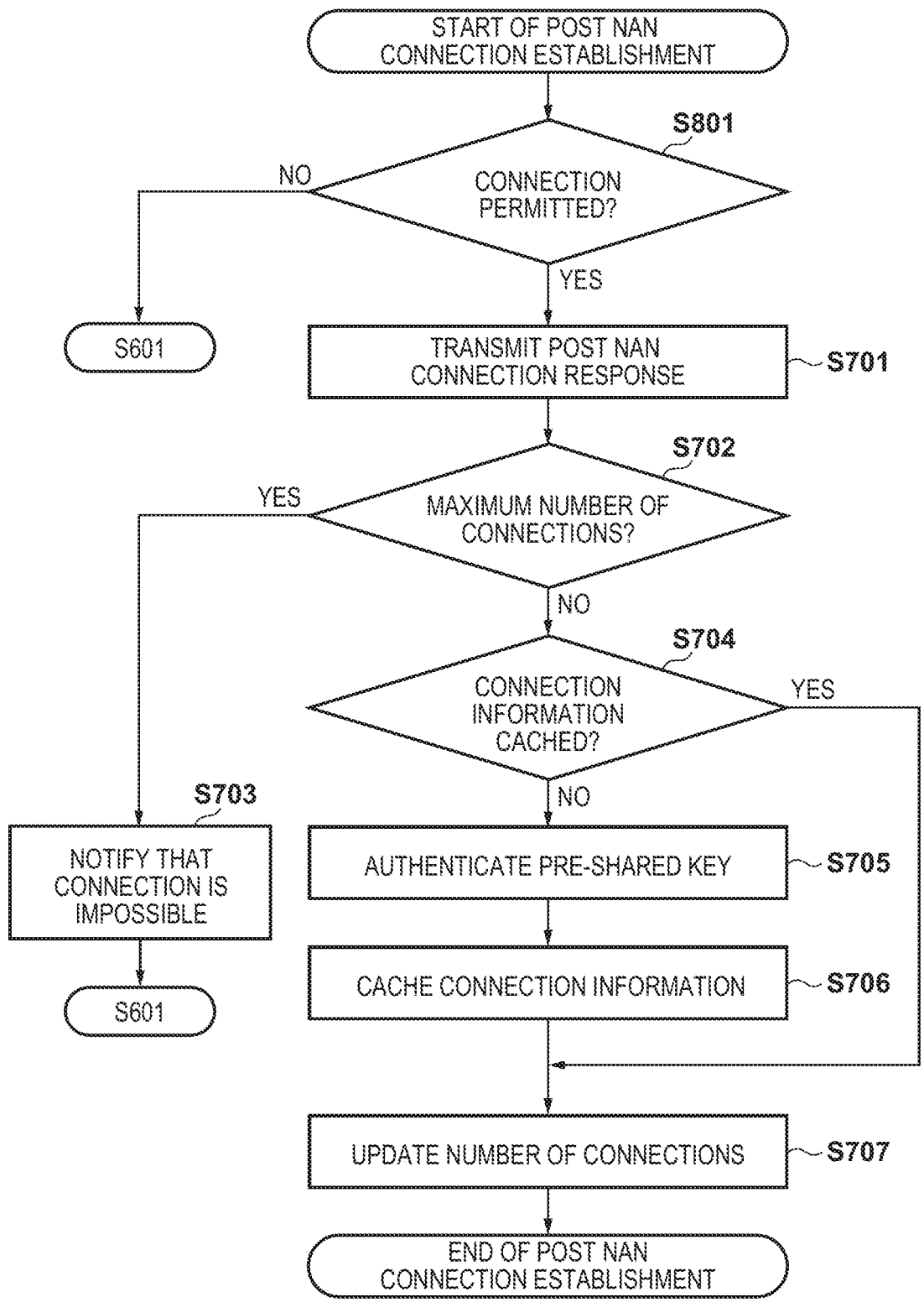
FIG. 8 is a flowchart showing post NAN connection establishment processing performed by a printing apparatus 100 according to an embodiment.

FIG. 8 shows a flowchart of step S605 according to this embodiment. The printing apparatus 100 displays, on the operation unit 209, that there is a post NAN connection request from the opposite terminal and notifies the user of this. The user can select whether to permit post NAN connection of the opposite terminal via the operation unit 209. The process advances to step S701 if the post NAN connection request is permitted. The process returns to step S601 if the post NAN connection request is refused.

Figure 9:
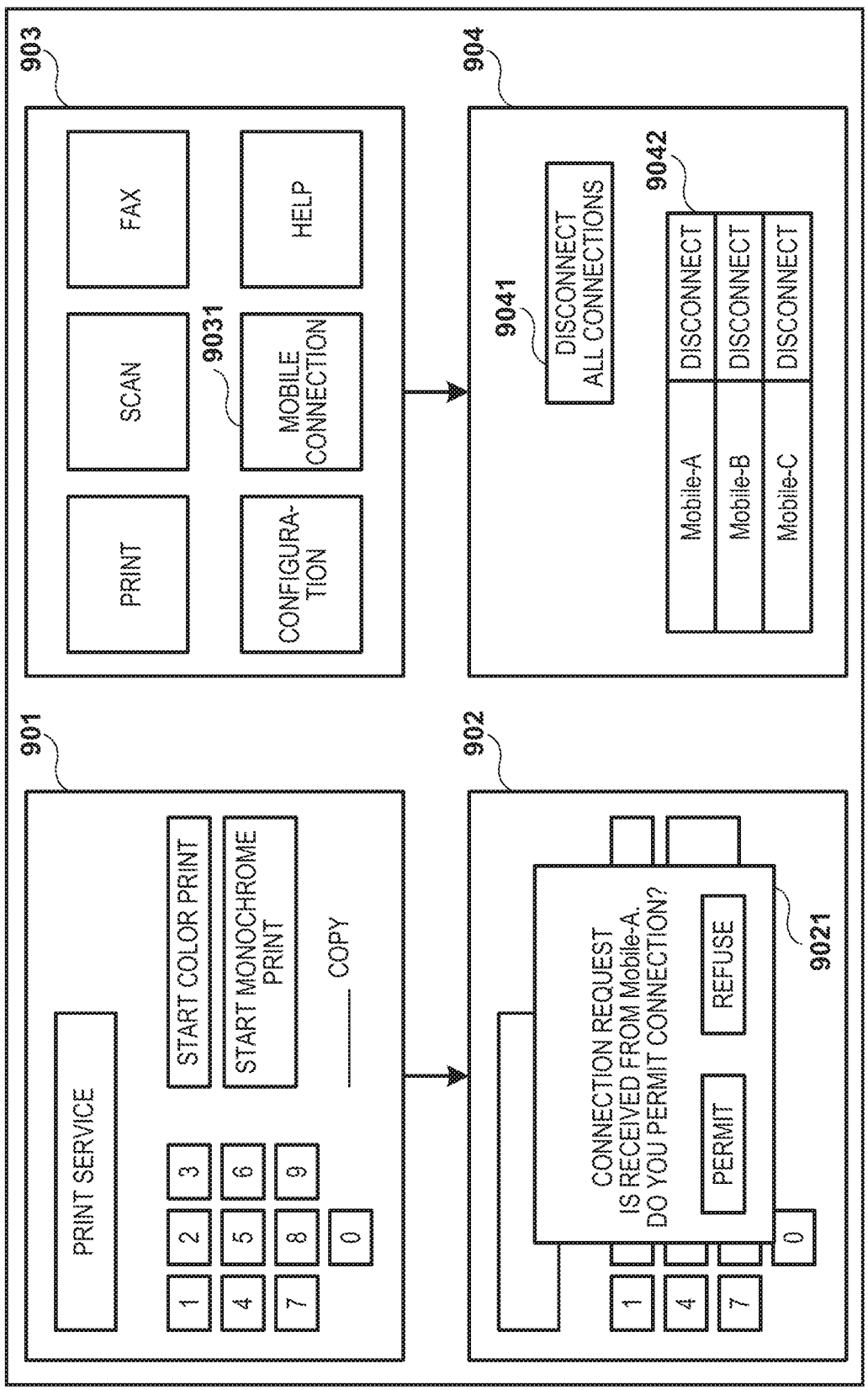
FIG. 9 is a block diagram showing screens for managing a connected terminal, which are displayed on an operation unit 209 of the printing apparatus 100 according to the embodiment.

The post NAN connection request of the opposite terminal can be permitted by, for example, reading out data of the permitted opposite terminal which is stored in a RAM 202, a ROM 203, or an HDD 204 to the printing apparatus 100. Alternatively, the post NAN connection request may be permitted by causing the user to operate the operation unit 209 when receiving the post NAN connection request. In this case, a dialogue that selects whether to permit the post NAN connection request may be displayed regardless of the status of the operation unit 209 if NAN is enabled. FIG. 9 shows operation screens for permitting the post NAN connection request by causing the user to operate the operation unit 209. An operation screen 901 is a screen for executing a print service by operating the printing apparatus 100 directly. If there is a connection request from the opposite terminal, as shown in, for example, a connection request permission screen 902, a dialogue for the user to permit or refuse the connection request can be superimposed and displayed.

On a menu screen 903 of the printing apparatus 100, buttons for executing respective functions such as a print function and a scan function are displayed. By selecting a mobile connection button 9031 on the menu screen 903, a mobile connection screen 904 where a configuration concerning mobile connection is performed is displayed. On the mobile connection screen 904, for example, a list of opposite terminals that have already been in post NAN connection to the printing apparatus 100 can be displayed. Opposite terminal information to be displayed may display any information such as a connection time or an IP address as long as the information can identify an opposite terminal. The user may disconnect connection of one or more opposite terminals by operating the operation unit 209 of the printing apparatus 100. Alternatively, the user may disconnect connection with all opposite terminals by selecting "disconnect all connections". Alternatively, the post NAN connection may be configured not only to be disconnected by operations on the above-described screens but also to be disconnected by, for example, an operation from the opposite terminal as described in the above-described first embodiment.

As described above, according to this embodiment, in addition to the first embodiment, the information processing apparatus determines whether to permit or refuse a connection request from the external apparatus to the information processing apparatus at the time of the connection request and disconnects connection with the external apparatus in accordance with a determination result. This makes it possible to prevent an unpermitted external apparatus from being connected to the information processing apparatus. It also becomes possible to appropriately manage external apparatuses to be connected if the number of connected external apparatuses is large and exceeds a limitation of the number of connections of the information processing apparatus.

Third Embodiment

The third embodiment of the present invention will be described below. In this embodiment, a printing apparatus 100 that has an operation screen capable of setting enabling or disabling of a NAN configuration after the completion of boot processing, which is a modification of the above-described first or second embodiment will be described. The hardware arrangement of the printing apparatus 100 according to this embodiment is the same as that of the printing apparatus 100 shown in FIG. 2, and thus a description thereof will be omitted. Moreover, in boot processing, a service providing notification, post NAN connection processing, and service execution processing performed by the printing apparatus 100 according to this embodiment, the same reference numerals denote those performing the same processing as the printing apparatus 100 according to the first embodiment, a description thereof will be omitted, and only a difference will be described.

A screen 1001 of FIG. 10 is an example of a screen before starting NAN. It is possible to select ON or OFF in a "continuous notification mode", and the configuration corresponds to a "continuous notification mode" on a NAN configuration screen 303 in FIG. 3. In addition, a "status" displays a status concerning NAN, and "stopping" is displayed because a NAN configuration is disabled in the status where the screen 1001 is displayed. By touching "start connection awaiting" on the screen 1001, the NAN configuration is enabled, connection from an opposite terminal becomes possible, and an operation unit 209 shifts from the screen 1001 to a screen 1002. At this time, the CPU 201 may set an IPv6 address for at least one interface that includes a NAN interface. Also at this time, a password 3031 of NAN or a service name (for example, "PRINT-0001") provided by the printing apparatus 100 may be displayed on the operation unit 209.

The screen 1002 is an example of a start screen of NAN. On the screen 1002, a "status" displays "awaiting" which represents connection awaiting. At this time, "the number of connected terminals" represents the number of opposite terminals currently set in post NAN connection, and "0" is displayed for the number of connected terminals on the screen 1002 because an opposite terminal in post NAN connection does not exist in this embodiment. By touching "stop connection awaiting" on the screen 1002, the printing apparatus 100 disables the NAN configuration and shifts to the screen 1001. A "disconnect all connections" button can be shaded and unselectable because the opposite terminal in post NAN connection does not exist on the screen 1002. When establishing post NAN connection with the opposite terminal, the operation unit 209 of the printing apparatus 100 shifts to a screen 1003.

The screen 1003 is an example of a screen after post NAN connection establishment. On the screen 1003, "the number of connected terminals" displays "1" or more. By touching "stop connection awaiting" on the screen 1003, the printing apparatus 100 disables the NAN configuration and shifts to the screen 1001. If post NAN connection has already been established at this time, the printing apparatus 100 disconnects all post NAN connections.

Note that disabling of the NAN configuration corresponding to the shift from the screen 1003 to the screen 1001 may be different from "disable" 3022 of NAN in FIG. 3. For example, disabling of a service level at which notifications of all services are set impossible may be performed, or disabling of a network level at which communication for forming and maintaining a NAN cluster is not performed may be performed.

If "disconnect, all connections" is selected on the screen 1003, the printing apparatus 100 disconnects all post NAN connections and shifts to the screen 1002. At this time, the NAN configuration is not disabled. Alternatively, post NAN connection of an opposite terminal which is being connected may be disconnected individually. For example, also in a case in which "disconnect" of all opposite terminals is selected, the printing apparatus 100 shifts to the screen 1002 as in a case in which "disconnect all connections" is selected. At this time as well, the NAN configuration is not disabled.

Note that a button for shifting to another screen such as a configuration screen may be arranged although it is not shown on the screens 1001 to 1003. If the button is selected, it may be possible to, for example, move to another screen while enabling NAN in a current configuration.

As described above, according to this embodiment, in addition to the first or second embodiment, the information processing apparatus further displays, on a display unit, an operation screen capable of setting switching between enabling and disabling of a communication mode. This makes it possible to control, for example, a change in NAN configuration without requiring reboot of the information processing apparatus.

Fourth Embodiment

The fourth embodiment of the present invention will be described below. In this embodiment, a printing apparatus 100 that establishes connection needed to execute a service by a communication method other than post NAN connection using IPv6, which is a modification of any one of the above-described first to third embodiments will be described. In the first embodiment, the printing apparatus 100 and the opposite terminal perform post NAN connection by using mutual IPv6 addresses. The printing apparatus 100 according to this embodiment communicates information for executing a service in a Wi-Fi Direct mode or an AP mode in order to communicate with an opposite terminal which does not support IPv6 communication.

The hardware arrangement of the printing apparatus 100 according to this embodiment is the same as that of the printing apparatus 100 shown in FIG. 2, and thus a description thereof will be omitted. Moreover, in boot processing, a service providing notification, post NAN connection processing, and service execution processing performed by the printing apparatus 100 according to this embodiment, the same reference numerals denote those performing the same processing as the printing apparatus 100 according to the first embodiment, a description thereof will be omitted, and only a difference will be described.

FIG. 11 is a flowchart showing post NAN connection processing according to the fourth embodiment. A CPU 201 receives a post NAN connection request in step S604 or S609 in FIG. 6, and then advances to step S1101 in which it determines whether an IPv6 address is included in a post NAN connection request signal. If the CPU 201 determines that the IPv6 address is included in the post NAN connection request, it determines that an opposite terminal can perform post NAN connection using IPv6 and advances to step S701 in FIG. 7. If the CPU 201 determines that the IPv6 address is not included in the connection request signal, it determines that the opposite terminal cannot perform post NAN connection using IPv6, advances to step S1102 in order to execute a service, and prompts communication using another operation mode to be described below.

In step S1102, the CPU 201 determines whether the Wi-Fi Direct mode is booted. If the CPU 201 determines that the Wi-Fi Direct mode is booted, the printing apparatus 100 advances to step S1103 in which a connection negotiation for Wi-Fi Direct connection is performed to establish connection and returns to step S601. If the CPU 201 determines in step S1102 that the Wi-Fi Direct mode is not booted, the process advances to step S1104 in which the CPU 201 determines whether the AP mode is booted. If the CPU 201 determines in step S1104 that the AP mode is booted, the process advances to step S1105 in which the printing apparatus 100 transmits its own SSID and authentication key to the opposite terminal. If the CPU 201 determines in step S1104 that the AP mode is not booted, the process advances to step S1106 in which an AP mode configuration is changed to "enable" and advances to step S1105. After establishing Wi-Fi Direct connection or AP connection with the opposite terminal, the printing apparatus 100 transmits/receives information needed to execute a service by using the connection. Note that if it is impossible to perform post NAN connection using IPv6, the printing apparatus 100 performs communication by another connection mode booted in advance. However, the printing apparatus 100 may receive a specific connection mode to which the opposite terminal corresponds and boot a corresponding connection mode.

As described above, according to this embodiment, it is determined whether an IP address is included in a connection request of the second communication mode received by a wireless communication unit. Furthermore, this information processing apparatus transmits a connection response in the second communication mode to an external apparatus if it is determined that the IP address is included, and transmits, to the external apparatus, information for establishing connection in the third communication mode different from both the first communication mode and the second communication mode if it is determined that the IP address is not included. This makes it possible to transmit/receive information needed to execute a service by performing communication by another connection method even if the opposite terminal does not support IPv6 communication, and it is impossible to perform post NAN connection using IPv6 communication.

Another Embodiment

The present invention is not limited to the above-described embodiments, and various modifications can be made. For example, the printing apparatus 100 according to any one of the above-described first to fourth embodiments may introduce password authentication in order to change the configuration of the printing apparatus 100. That is, for example, if a NAN configuration is changed, or if a terminal in post NAN connection is managed, the printing apparatus 100 may request a user input. This makes it possible to prevent a user provided with a service such as printing or scanning of the printing apparatus 100 from being influenced by an operation of another user who does not know the configuration of the printing apparatus 100 well.

Each process shown in the flowcharts according to this invention may be executed when a CPU 201 loads a control program stored in a memory such as a ROM 203 into a RAM 202 and executes it. Furthermore, in a printing apparatus 100 according to this embodiment, one CPU 201 executes each process shown in the flowchart. However, another mode may be adopted. Alternatively, a plurality of CPUs may cooperate so as to execute each process shown in the flowchart.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-188983, filed on Sep. 28, 2017, which is hereby incorporated by reference herein in its entirety.

The invention claimed is:

1. An information processing apparatus configured to perform communication using a first communication mode supporting a function for communicating information concerning a service to be provided to an external apparatus, with the external apparatus, using Internet Protocol version 4 (IPv4) address or Internet Protocol version 6 (IPv6) address, and a second communication mode, which does not support performing communication using IPv4 address and supports performing communication using an IPv6 address, comprising:
    at least one memory that stores a set of instructions; and
    at least one processor that executes the instructions, causing the information processing apparatus to perform operations including:
        setting at least one type of an Internet Protocol (IP) address used for communication out of the IPv4 address and the IPv6 address as an operation setting of the information processing apparatus; and
        in a case where use of the second communication mode is enabled on the information processing apparatus and the operation setting is set to use the IPv4 address and not to use the IPv6 address for communication, assigning the IPv6 address as the IP address to be used in the second communication mode.

2. The apparatus according to claim 1, wherein the operations further include:
    transmitting, to the external apparatus, information indicating the service provided by using the function.

3. The apparatus according to claim 1, wherein the IPv6 address used in the first communication mode is a link local address using an IPv6 format.

4. The apparatus according to claim 1, wherein the function is a function for communicating service information to the external apparatus in a period, repeated in a predetermined cycle, in which beacons are transmitted or received by a plurality of apparatuses including the information processing apparatus.

5. The apparatus according to claim 1, wherein the operations further include:
    receiving a connection request of the second communication mode from the external apparatus after communicating information concerning the service with the external apparatus using the function;
    determining whether the received connection request includes information related to the IPv6 address;
    transmitting a connection response in the second communication mode to the external apparatus if it is determined that the information is included, and
    transmitting, to the external apparatus, information for establishing connection in a third communication mode different from both the first communication mode and the second communication mode if it is determined that the information is not included.

6. The apparatus according to claim 1, wherein the information processing apparatus is an image processing apparatus, and
    the information concerning the service to be provided to the external apparatus using the function includes information concerning at least one of a printing service and a scan service.

7. A method of controlling an information processing apparatus that performs communication using a first communication mode supporting a function for communicating information concerning a service to be provided to an external apparatus, with the external apparatus, using Internet Protocol version 4 (IPv4) address or Internet Protocol version 6 (IPv6) address, and a second communication mode, which does not support performing communication using IPv4 address and supports performing communication using an IPv6 address, the method comprising:
    setting using the IPv4 address and not using the IPv6 address for communication as an operation setting of the information processing apparatus;
    enabling the second communication mode on the information processing apparatus; and
    assigning the IPv6 address as the IP address to be used for communication in the second communication mode.

8. A non-transitory computer-readable storage medium storing instructions for causing a computer to execute respective steps in a method of controlling an information processing apparatus that performs communication using a first communication mode supporting a function for communicating information concerning a service to be provided to an external apparatus, with the external apparatus, using Internet Protocol version 4 (IPv4) address or Internet Protocol version 6 (IPv6) address, and a second communication mode, which does not support performing communication using IPv4 address and supports performing communication using an IPv6 address, the method comprising:

setting using the IPv4 address and not using the IPv6 address for communication as an operation setting of the information processing apparatus;

enabling the second communication mode on the information processing apparatus; and assigning the IPv6 address as the IP address to be used for communication in the second communication mode.

9. The apparatus according to claim 4, wherein the period is a Discovery Window (DW) of Neighbor Awareness Networking (NAN).

10. The apparatus according to claim 1, wherein, in a case where use of the first communication mode is enabled on the information processing apparatus and the operation setting is set to use the IPv4 address and not to use the IPv6 address for communication, the operations further include assigning the IPv4 address as the IP address to be used in the first communication mode and not accepting an assignment of the IPv6 address as the IP address to be used in the first communication mode.

11. The apparatus according to claim 1, wherein the operations further include, in a case where the use of the second communication mode is enabled on the information processing apparatus, assigning a link local address of IPv6 corresponding to MAC (Media Access Control) of a network interface of the image processing apparatus as the IP address used in the second communication mode.

12. The apparatus according to claim 11, wherein the link local address is assigned as the IP address used in the second communication mode in a case where the information processing apparatus is powered on.

13. The apparatus according to claim 1, wherein the operations further include displaying a setting screen that accepts user operations for setting the operation setting.

14. An information processing apparatus configured to perform communication using a first communication mode using Internet Protocol version 4 (IPv4) address or Internet Protocol version 6 (IPv6) address, and a second communication mode, which does not support performing communication using IPv4 address and supports performing communication using an IPv6 address, comprising:

at least one memory that stores a set of instructions; and at least one processor that executes the instructions, causing the information processing apparatus to perform operations including:

setting at least one type of an Internet Protocol (IP) address used for communication out of the IPv4 address and the IPv6 address as an operation setting of the information processing apparatus; and in a case where use of the second communication mode is enabled on the information processing apparatus and the operation setting is set to use the IPv4 address and not to use the IPv6 address for communication, assigning the IPv6 address as the IP address to be used in the second communication mode.

* * * * *